(12) United States Patent
Brandenstein et al.

(10) Patent No.: US 7,021,612 B2
(45) Date of Patent: Apr. 4, 2006

(54) ROLLER BEARING

(75) Inventors: Manfred Brandenstein, Eussenheim (DE); Hubert Herbst, Gädheim (DE); Arno Stubenrauch, Aidhausen (DE); Armin Olschewski, Schweinfurt (DE)

(73) Assignee: AB SKF, Gothenburg (SE)

( * ) Notice: Subject to any disclaimer, the term of this patent is extended or adjusted under 35 U.S.C. 154(b) by 0 days.

(21) Appl. No.: 10/948,435

(22) Filed: Sep. 24, 2004

(65) Prior Publication Data

US 2005/0093217 A1 May 5, 2005

(30) Foreign Application Priority Data

Sep. 26, 2003 (DE) ................. 103 44 804

(51) Int. Cl.
*B60G 11/10* (2006.01)
(52) U.S. Cl. .................... 267/267; 267/274; 384/127; 384/571
(58) Field of Classification Search ............... 267/274, 267/27, 29, 267, 268, 279, 270; 384/571, 384/477, 486, 127, 128, 126
See application file for complete search history.

(56) References Cited

U.S. PATENT DOCUMENTS

| | | | | | |
|---|---|---|---|---|---|
| 1,872,814 | A | * | 8/1932 | Riblet | 267/267 |
| 1,908,956 | A | * | 5/1933 | Chievitz | 384/489 |
| 1,909,732 | A | * | 5/1933 | Thompson et al. | 267/267 |
| 2,977,138 | A | * | 3/1961 | Brittain, Jr. | 277/552 |
| 3,628,837 | A | * | 12/1971 | Otto | 384/462 |
| 3,790,238 | A | * | 2/1974 | Otto | 384/486 |
| 3,833,277 | A | * | 9/1974 | Jones et al. | 384/459 |
| 5,462,367 | A | * | 10/1995 | Davidson et al. | 384/459 |
| 5,897,107 | A | * | 4/1999 | Zierden et al. | 267/267 |
| 6,126,321 | A | * | 10/2000 | Fetty et al. | 384/459 |
| 6,845,986 | B1 | * | 1/2005 | Hood et al. | 277/409 |

* cited by examiner

*Primary Examiner*—James McClellan
*Assistant Examiner*—Mariano Sy
(74) *Attorney, Agent, or Firm*—Buchanan Ingersoll PC

(57) ABSTRACT

A swivel mounting is made as a double-row roller bearing and has an outer ring with a first outer track and a second outer track, a first inner ring with a first inner track, and a second inner ring with a second inner track which is located axially next to the first inner ring. Two sets of rollers roll between the outer tracks of the outer ring and the inner tracks of the inner rings. The swivel mounting is constructed such that the outer ring with the first inner ring and the second inner ring forms one axial slide bearing at a time.

21 Claims, 1 Drawing Sheet

ROLLER BEARING

This application is based on and claims priority under 35 U.S.C. § 119 with respect to German Application No. 103 44 804.7 filed on Sep. 26, 2003, the entire content of which is incorporated herein by reference.

FIELD OF THE INVENTION

This invention generally relates to a swivel mount. More particularly, the invention pertains to a swivel mounting for swiveling suspension of the spring system of a motor vehicle.

BACKGROUND DISCUSSION

The wheels of a motor vehicle or the axles on which the wheels are mounted are generally spring-mounted on the chassis of the vehicle in order to achieve a high level of driving comfort and a high level of driving safety. The spring systems used in this case are generally swivel-mounted so that deflection in and out takes place as smoothly as possible. The spring system can be, for example, a leaf spring arrangement which consists of several springs stacked on top of one another. In this connection, it is known to suspend the ends of the leaf spring stack each by way of a slide bearing to be able to swivel on the chassis in order to enable unhindered motion of the leaf spring stack as it is deflected in and out. In the area of one of the ends of the leaf spring stack there is another swivel bearing in order to compensate for the change in length which is associated with the deflection of the leaf spring stack in and out. The slide bearings which have long been used for this purpose are able to accommodate the comparatively large radial forces in spite of the installation space which is very limited in the radial direction and have proven effective. In any case, it is necessary to relubricate the slide bearings to ensure proper operation.

SUMMARY

According to one aspect, a swivel mounting is made as a double-row roller bearing and comprises an outer ring having a first outer track and a second outer track, a first inner ring possessing a first inner track, and a second inner ring located axially next to the first inner ring and possessing a second inner track. A first set of rollers rolls between the first outer track and the first inner track, and a second set of rollers rolls between the second outer track and the second inner track. The outer ring together with the first inner ring and the second inner ring form one axial slide bearing at a time.

The invention has the advantage that by using the outer ring, the two inner rings can be kept to a defined axial distance and so no further aids such as, for example, a spacer sleeve are required. In this way, parts can be saved and the installation of the swivel mounting can be simplified.

In one preferred embodiment, one axial slideway lining is provided on the axial end surface of the first inner ring or the adjacent axial opposing surface of the outer ring, and one axial slideway lining is provided on the axial end surface of the second inner ring or the adjacent axial opposing surface of the outer ring. In this way good slide properties of the two axial slide bearings can be achieved with a relatively simple structure.

In the axial area between the first outer track and the second outer track, the outer ring can have a radial thickening. This has the advantage that very high mechanical stability can be achieved. Here the two axial opposing surfaces of the outer ring can be made in the area of the radial thickening of the outer ring.

The inner peripheral surface of the outer ring, in the area of the radial thickening, forms with the opposing radial surface a seal gap. This results in the lubricant held in the swivel mounting remaining in the axial area of the inner and outer tracks. The inner peripheral surface of the outer ring in the axial area between the first outer track and the second outer track is spaced at least in sections at most 0.5 mm from the opposing radial surface. Further, this distance is preferably at least 0.05 mm.

In one alternative embodiment of the swivel mounting, the inner peripheral surface of the outer ring forms a radial slide bearing, in the axial area between the two outer tracks, with the opposing radial surface. In the radial slide bearing, there can be radial play which is preferably between 30 microns and 60 microns. The radial slide bearing makes it possible for the swivel mounting to accommodate relatively high loads. Here, it is especially advantageous to make the swivel mounting such that the inner peripheral surface of the outer ring is supported on the opposing radial surface when a threshold value for the radial load acting on the swivel mounting is exceeded. As a result, for relatively small radial loads the swivelling motion takes place by the rolling of the rolling elements on the tracks. For relatively high radial loads, especially for pulse-like loads, which lead to temporary deformation of the outer ring, the load is accommodated by the radial slide bearing and in this way especially the extent of deformation of the outer ring is limited. This has the advantage that the roller bearing can be designed simply for the steady load which can be expected in operation. Also, load peaks which may occur are accommodated by the radial slide bearing.

The inner peripheral surface of the outer ring or the opposing radial surface can have a radial slideway lining. This has the advantage that the wheel slide bearing need not be regularly relubricated and, depending on the application, can be made maintenance-free for the entire service life.

In the execution of the swivel mounting, it is also advantageous if the outer ring has a cylindrical outer peripheral surface and the diameter of the outer ring is reduced in the area of its two axial ends. This can help facilitate the pressing of the outer ring into a hole or into some other installation environment, while also inhibiting or preventing the comparatively thin axial ends of the outer ring from being damaged or deformed during installation.

The roller bearing is preferably made as a taper roller bearing or as a cylindrical roller bearing, especially an angular cylindrical roller bearing.

BRIEF DESCRIPTION OF THE DRAWING FIGURES

The foregoing and additional features will become more apparent from the following detailed description considered together with reference to the accompanying drawing figures in which like elements are designated by like reference numerals.

DETAILED DESCRIPTION

Figure 1:
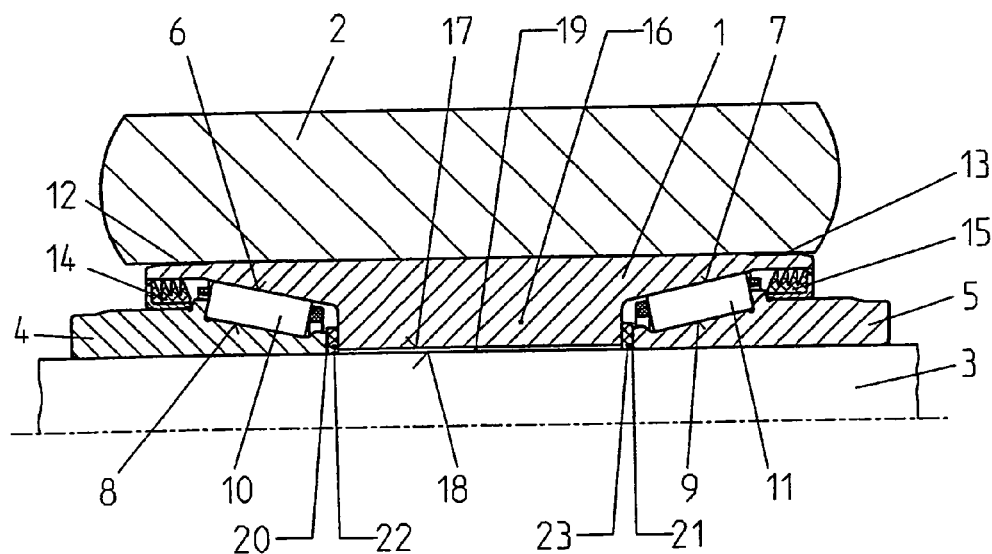
FIG. 1 is a cross-sectional view of a first embodiment of a swivel mounting according to the present invention.

FIG. 1 shows a first embodiment of the swivel mounting which is in the form of a double-row angular cylindrical roller bearing comprising an outer ring 1 which is pressed into the eye of the leaf spring 2. The leaf spring 2 is a component of a leaf spring stack with which the axle of a truck is sprung on the chassis. A first inner ring 4 and a second inner ring 5 are pressed onto a pin 3 which is permanently joined to the chassis of the truck. The outer ring 1 has a first outer track 6 and a second outer track 7 which are axially spaced from one another. In a corresponding manner, the first inner ring 4 has a first inner track 8 which opposes or is positioned opposite the outer track 6, and the second inner ring 5 has a second inner track 9 which opposes or is positioned opposite the outer track 7.

A first set of cylindrical rollers 10 is positioned between the first outer track 6 and the first inner track 8, and a second set of cylindrical rollers 11 is located between the second outer track 7 and the second inner track 9. Radial gaps are formed in the axial end areas 12, 13 of the outer ring 1 between the outer ring 1 and the first and second inner rings 4, 5. These radial gaps are sealed by respective gaskets 14, 15. The inner area of the double-row angular cylindrical roller bearing, which area is sealed by the gaskets 14, 15, is filled with a lubricant, preferably a grease.

In the axial area between the first outer track 6 and the second outer track 7 the outer ring 1 has a thickening or thickened area 16 which is pointed radially inward. The thickening 16 extends so near to the pin 3 that the inner peripheral surface 17 of the outer ring 1 and the outer peripheral surface 18 of the pin 3 form a seal gap 19 with one another. The thickening 16 of the outer ring 1 radially overlaps with the axial end surfaces 20, 21 of the two inner rings 4, 5, which end surfaces are adjacent at the time. Axial slideway linings 22, 23 which axially adjoin the thickening 16 of the outer ring 1 are attached to the axial end surfaces 20, 21 of the two inner rings 4, 5. This ensures that the two inner rings 4, 5 are held at a minimum axial distance to one another which corresponds to the axial extension of the outer ring 1 in the area of the thickening 16. When the leaf spring 2 swivels relative to the pin 3, a sliding motion occurs between the outer ring 1 and the adjacent axial slideway linings 22, 23 of the inner rings 4, 5, by which the swiveling motion is not adversely affected to any significant degree.

In one modification of the first embodiment shown in FIG. 1, it is also possible to attach the axial slideway linings 22, 23 to the outer ring 1.

The inner peripheral surface of the outer ring in the area of the radial thickening is spaced, at least in sections, at most 0.5 mm from the opposing radial surface 18. That is, to ensure a sufficient contact surface between the outer ring 1 and the axial slideway linings 22, 23, the radial extension of the seal gap 19 is made relatively small, preferably between 0.05 mm and 0.5 mm. At these dimensions, it is possible to generally ensure that the lubricant remains in the axial section in which the rolling motion of the cylindrical rollers 10, 11 takes place. Additionally, this helps generally ensure that the double-row angular cylindrical roller bearing can be swivelled in a relatively unobstructed manner. Further, with this geometry, a very high wall thickness of the outer ring 1 can be achieved so that the outer ring 1 is very stable against deformations. Since the outer ring 1 must generally be pressed securely into the eye of the leaf spring 2 to achieve a minimum ejection force, and thus very high radial forces can occur due to eccentricities of the eye of the leaf spring 2, the stability of shape of the outer ring 1 acquires decisive importance with respect to the proper operation of the double-row angular cylindrical roller bearing. Even if the radial wall thickness of the outer ring 1 in the area of the first outer track 6 and the second outer track 7 is limited by the required free space for the rolling elements 10, 11, it has been shown that sufficient stability of shape is possible by optimizing the radial wall thickness in the axial area between the outer tracks 6, 7.

To facilitate the pressing of the outer ring 1 into the eye of the leaf spring 2 and in order to prevent damage and deformations of the outer ring 1, the outer ring 1 in its two axial end areas 12, 13 has a reduced outer diameter so that in the axial end areas 12, 13 there is no radial overlap with the eye of the leaf spring 2, or only little occurs in any case. The above described geometry is thus designed for executing the double-row angular cylindrical roller bearing as solid as possible, since otherwise under the given boundary conditions the use of an antifriction bearing would generally not be possible.

Figure 2:
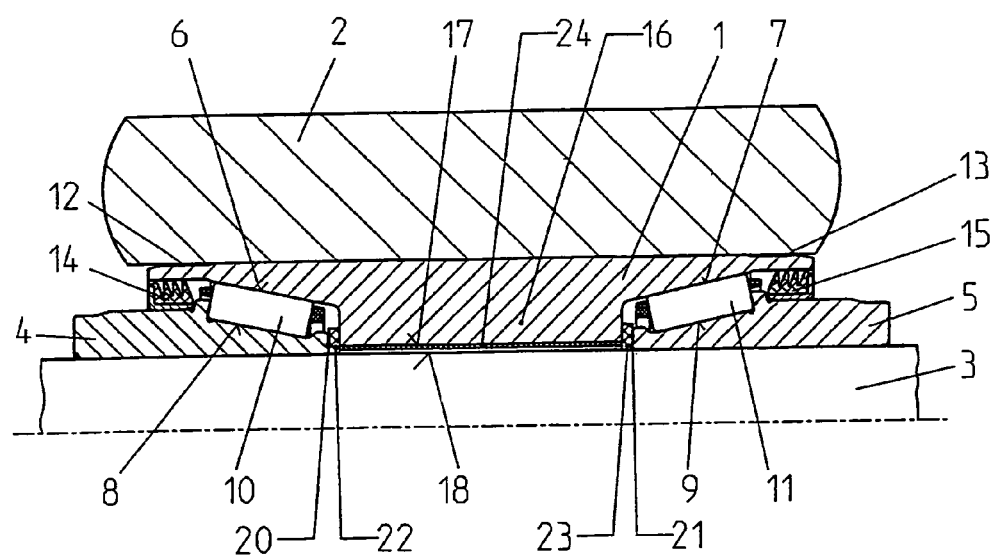
FIG. 2 is a cross-sectional view of a second embodiment of the swivel mounting according to the present invention.

FIG. 2 shows a second embodiment of the swivel mounting. The installation environment shown in FIG. 2 is analogous to that shown in FIG. 1 and described above. This second embodiment differs from the first embodiment in that a radial slideway lining 24 is attached on the inner peripheral surface 17 of the outer ring 1. In this way, a radial slide bearing is formed between the outer ring 1 and the pin 3. This radial slide bearing in any case has relatively great play, preferably on the order of 30 to 60 microns, and is thus disengaged by the additionally present angular cylindrical roller bearing under the operating conditions prevailing here, since the angular cylindrical roller bearing centers the inner peripheral surface 17 of the outer ring 1 and the outer peripheral surface 18 of the pin 3 with high precision and thus the radial slideway lining 24 is located over the entire periphery at the same distance to the pin 3. But if very strong radial loads arise which exceed a threshold value, as a result of deformation of the outer ring 1, contact between the radial slideway lining 24 of the outer ring 1 and the outer peripheral surface 18 of the pin 3 occurs. More extensive deformation can take place only to a very small extent in which the radial slideway lining 24 is radially upset. Here the radial slideway lining 24 develops a damping action. Even under this high load, swivelling of the leaf spring 2 relative to the pin 3 is possible. By a combination of the angular cylindrical roller bearing and the radial slide bearing, especially strong radial loads which occur in pulses can also be accommodated without damage to the bearing arrangement. The radial slide bearing takes effect only at these high radial loads. For small radial loads the swivel-mounting of the leaf spring 2 relative to the pin 3 takes place solely by the double-row angular cylindrical roller bearing. The threshold value for the radial load starting from which activation of the radial slide bearing takes place can be dictated via the geometry of the thickening 16 of the outer ring 1 and via the radial distance between the radial slideway lining 24 and the outer peripheral surface 18 of the pin 3. Since predominantly only the angular cylindrical roller bearing is in operation and moreover the radial slide bearing has a radial slideway lining 24 of sliding material, it is possible to provide the bearing arrangement with lifetime lubrication and thus make it maintenance-free. In one modification of the second embodiment, it is fundamentally also possible to attach the radial slideway lining 24 to the pin 3.

The roller bearing is preferably made as a taper roller bearing or as a cylindrical roller bearing, especially an angular cylindrical roller bearing.

The embodiments of the swivel bearing described above can be operated maintenance-free as much as possible and, in spite of a small radial installation space, can accommodate large radial forces. The swivel bearing is well suited for use in connection with a swiveling suspension of the spring system of a motor vehicle.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A swivel suspension of a spring system of a motor vehicle, comprising:
    a leaf spring;
    a pin permanently joined to a chassis of the vehicle;
    a double-row roller bearing positioned between the leaf spring and the pin, the double-row roller bearing comprising an outer ring possessing a first outer track and a second outer track, a first inner ring possessing a first inner track, a second inner ring axially spaced from the first inner ring and possessing a second inner track, at least one first roller which rolls between the first outer track and the first inner track, at least one second roller which rolls between the second outer track and the second inner track, and the outer ring together with the first inner ring and the second inner ring forming one axial slide bearing.

2. The swivel suspension according to claim 1, comprising a first axial slideway lining positioned between an axial end surface of the first inner ring and an opposing axial surface of the outer ring, the first axial slideway lining being attached to one of the first inner ring and the outer ring, and a second axial slideway lining positioned between an axial end surface of the second inner ring and an opposing axial surface of the outer ring, the second axial slideway lining being attached to one of the second inner ring and the outer ring.

3. The swivel suspension according to claim 1, wherein the outer ring has a radial thickening which is positioned between the first inner ring and the second inner ring.

4. The swivel suspension according to claim 1, comprising a radial slideway lining positioned between an inner peripheral surface of the outer ring and an opposing surface of the pin.

5. The swivel suspension according to claim 1, wherein the outer ring has a cylindrical outer peripheral surface, and a diameter of the outer ring is reduced at opposite axial ends.

6. A swivel mounting formed as a double-row roller bearing and comprising an outer ring having a first outer track and a second outer track, a first inner ring possessing a first inner track, a second inner ring located axially next to the first inner ring and possessing a second inner track, a first set of rollers which roll between the first outer track and the first inner track, a second set of rollers which roll between the second outer track and the second inner track, and the outer ring with the first inner ring and the second inner ring forming one axial slide bearing.

7. The swivel mounting according to claim 6, comprising an axial slideway lining on an axial end surface of the first inner ring or an opposing first axial surface of the outer ring, and an axial slideway lining on an axial end surface of the second inner ring or an opposing second axial surface of the outer ring.

8. The swivel mounting according to claim 7, wherein the outer ring has a radial thickening positioned axially between the first inner ring and the second inner ring.

9. The swivel mounting according to claim 8, wherein the first and second axial surfaces of the outer ring are provided in the radial thickening of the outer ring.

10. The swivel mounting according to claim 8, wherein an inner peripheral surface of the outer ring in the radial thickening forms a seal gap with an opposing radial surface.

11. The swivel mounting according to claim 8, wherein an inner peripheral surface of the outer ring in the area of the radial thickening is spaced, at least in sections, at most 0.5 mm from an opposing radial surface.

12. The swivel mounting according to claim 8, wherein an inner peripheral surface of the outer ring in the area of the radial thickening is spaced at least 0.05 mm from an opposing radial surface.

13. The swivel mounting according to claim 8, wherein an inner peripheral surface of the outer ring in an area of the radial thickening forms a radial slide bearing with an opposing radial surface.

14. The swivel mounting according to claim 13, wherein there is radial play in the radial slide bearing.

15. The swivel mounting according to claim 14, wherein the radial play is between 30 microns and 60 microns.

16. The swivel mounting according to claim 6, wherein an inner peripheral surface of the outer ring is supported on an opposing radial surface when a threshold value for a radial load acting on the swivel mounting is exceeded.

17. The swivel mounting according to claim 6, wherein an inner peripheral surface of the outer ring or an opposing radial surface is provided with a radial slideway lining.

18. The swivel mounting according to claim 6, wherein the outer ring has a cylindrical outer peripheral surface, and a diameter of the outer ring is reduced at opposite axial ends.

19. The swivel mounting according to claim 6, wherein the roller bearing is made as a cylindrical roller bearing.

20. The swivel suspension according to claim 1, wherein the first and second outer tracks are integrally formed in one piece as a part of the outer ring.

21. The swivel mounting according to claim 6, wherein the outer ring possess a radial thickening that is integrally formed in one piece as a part of the outer ring, the radial thickening being axially located between the first and second inner rings to form the axial slide bearing.

* * * * *